Figure 6:
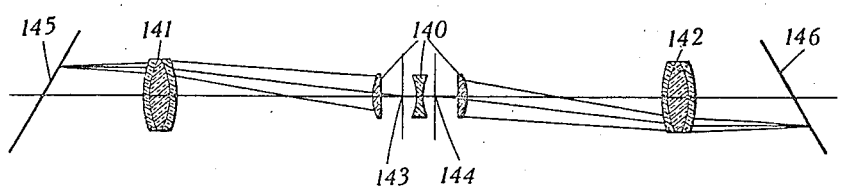

Sept. 16, 1941.  R. E. REASON  2,256,102
OPTICAL MEASURING OR TESTING APPARATUS
Filed June 1, 1938  13 Sheets-Sheet 1
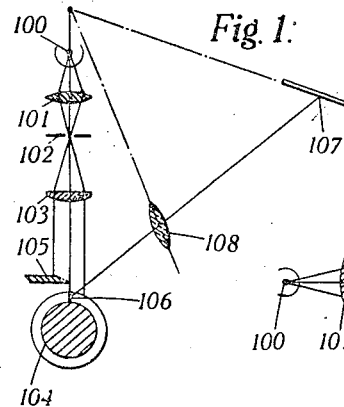
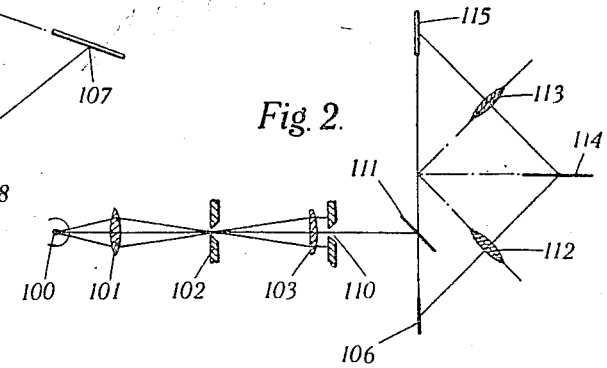
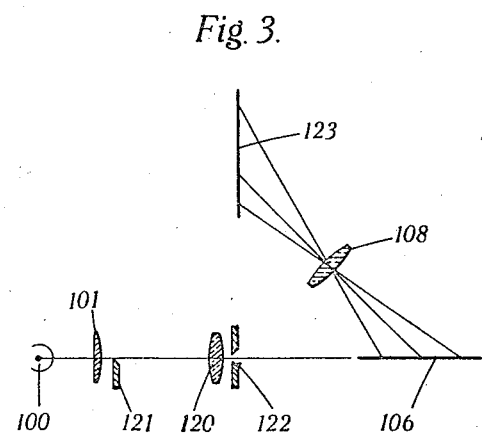
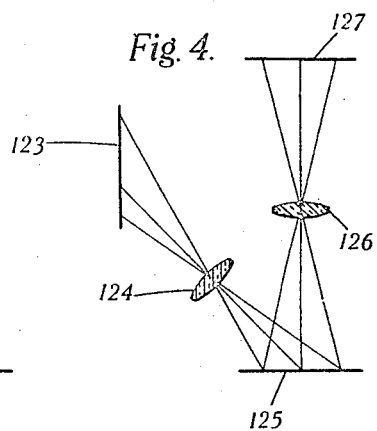
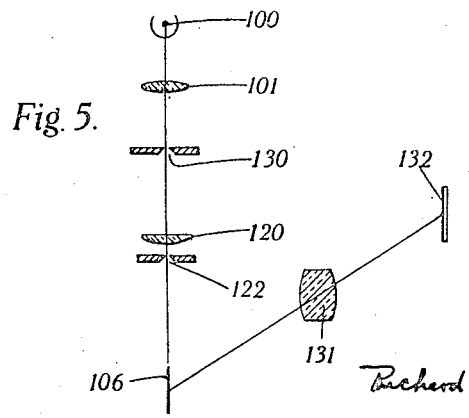
INVENTOR
Richard Edmund Reason
BY
Arthur L. Kent
his ATTORNEY

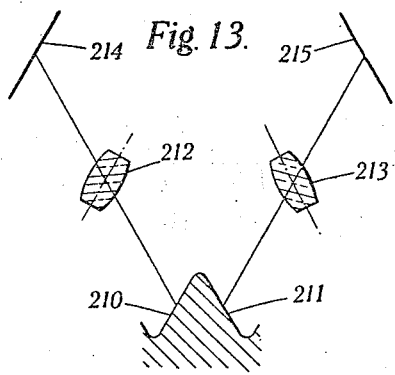
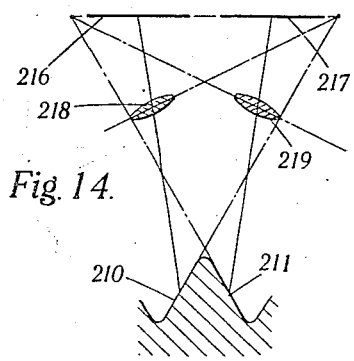
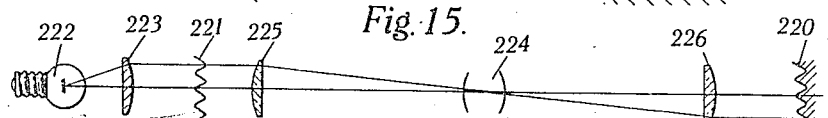
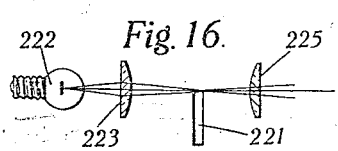
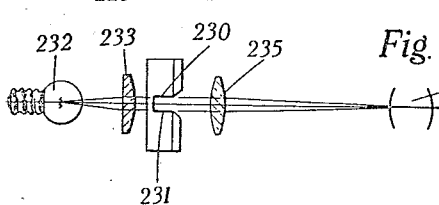
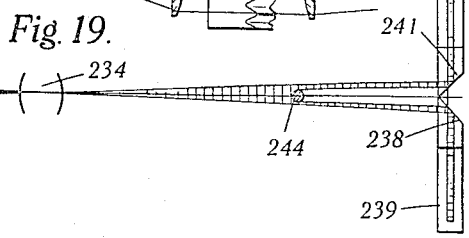
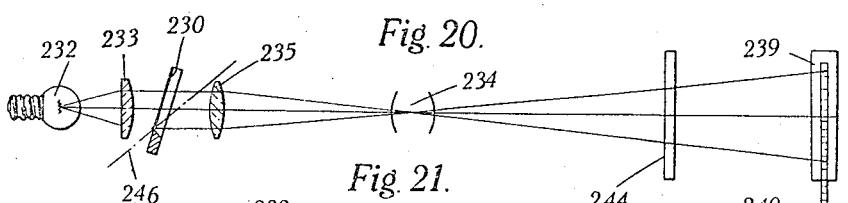
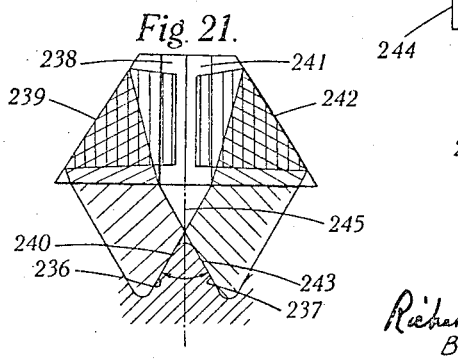

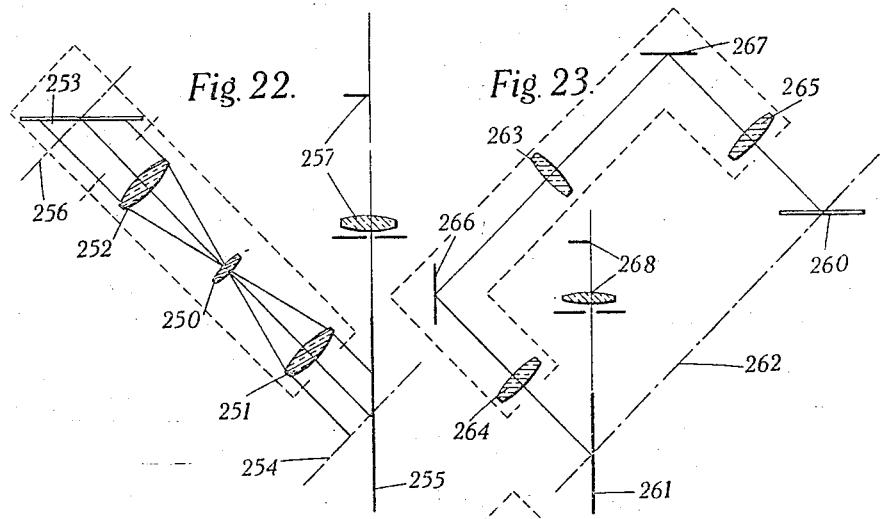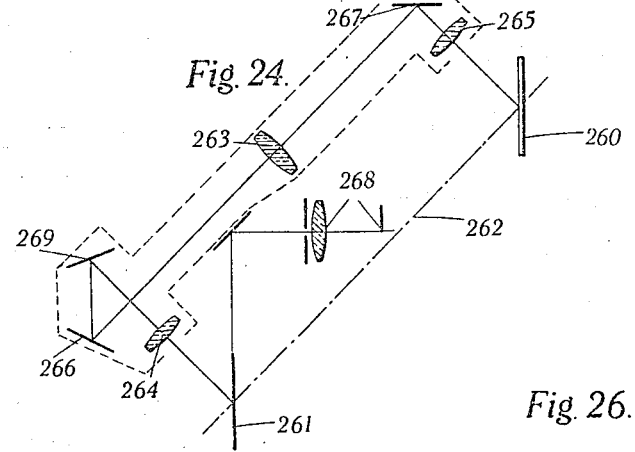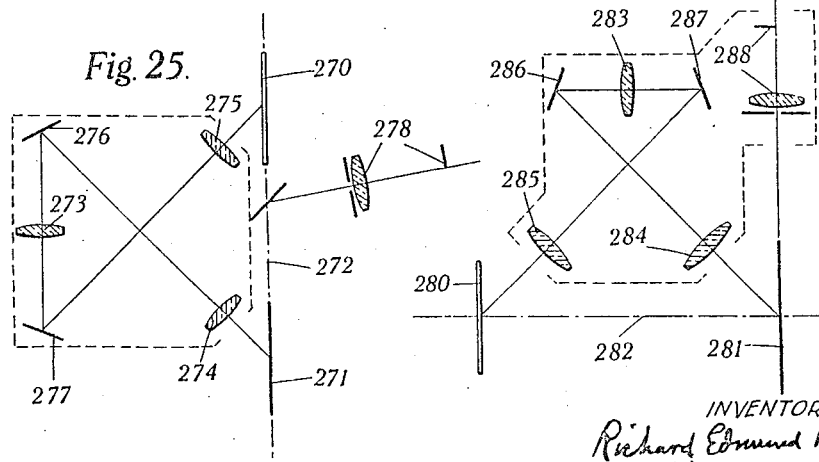

Sept. 16, 1941.   R. E. REASON   2,256,102
OPTICAL MEASURING OR TESTING APPARATUS
Filed June 1, 1938   13 Sheets-Sheet 6

INVENTOR
Richard Edmund Reason
BY
Arthur L Kurtz
his ATTORNEY.

Sept. 16, 1941.   R. E. REASON   2,256,102
OPTICAL MEASURING OR TESTING APPARATUS
Filed June 1, 1938   13 Sheets-Sheet 7
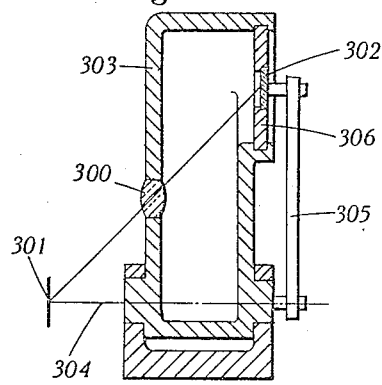
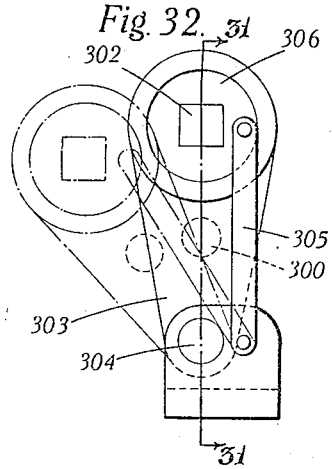
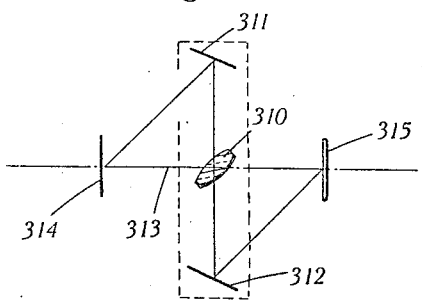
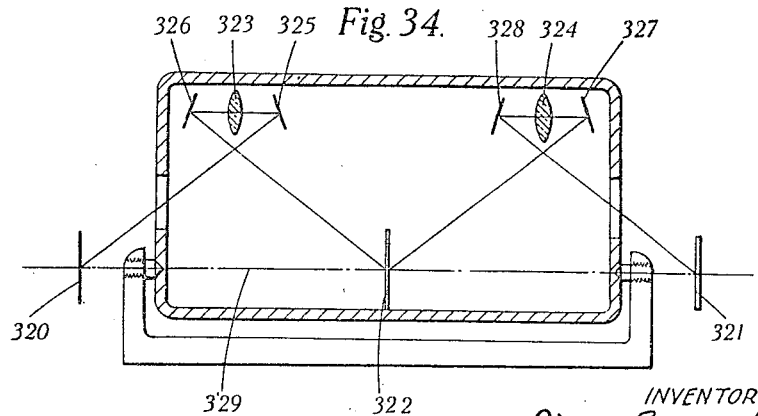
INVENTOR
Richard Edmund Reason
BY
Arthur L. Kent
his ATTORNEY Sept. 16, 1941. R. E. REASON 2,256,102
OPTICAL MEASURING OR TESTING APPARATUS
Filed June 1, 1938 13 Sheets-Sheet 8

INVENTOR
Richard Edmund Reason
BY
Arthur J. Kent
ATTORNEY

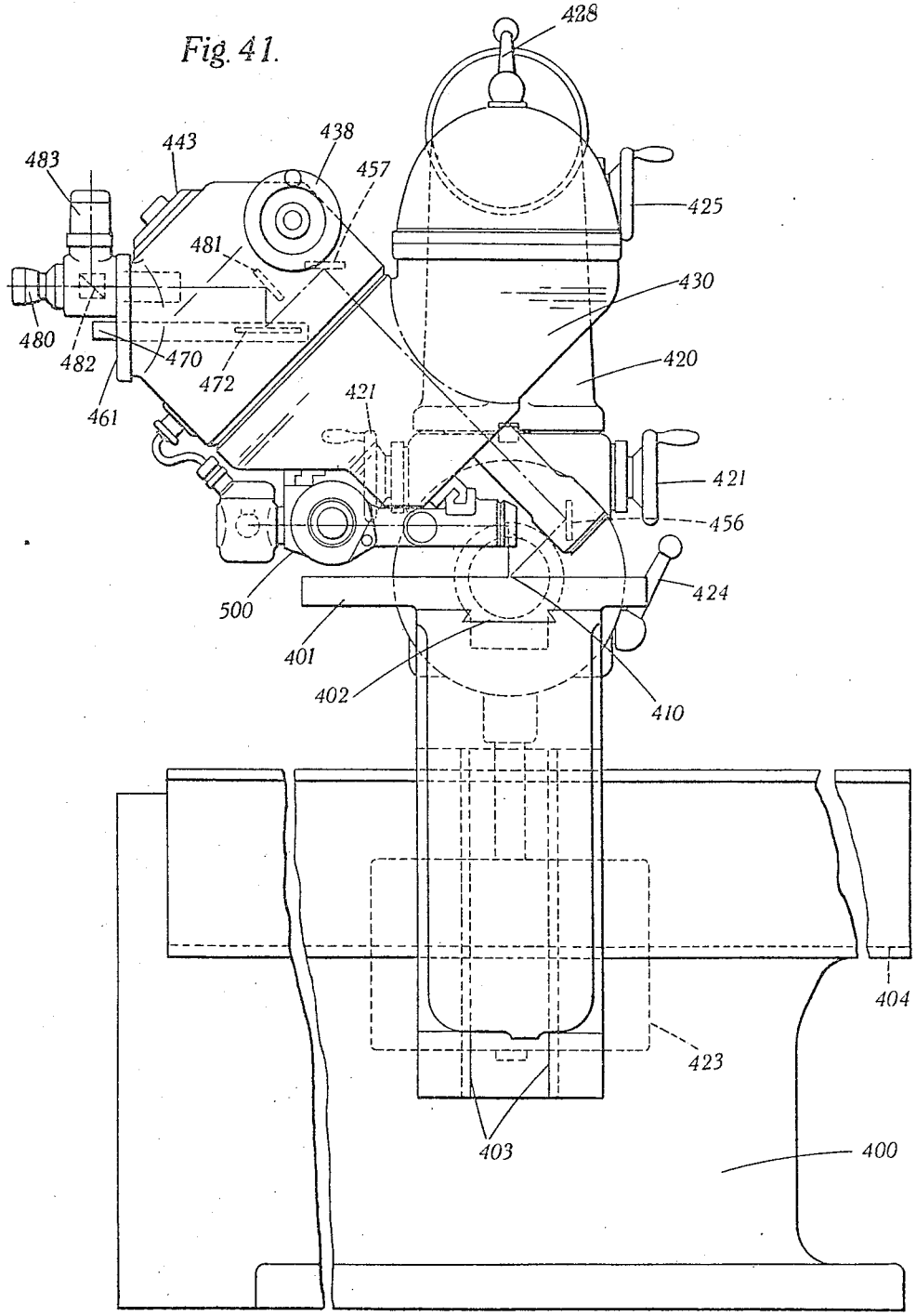

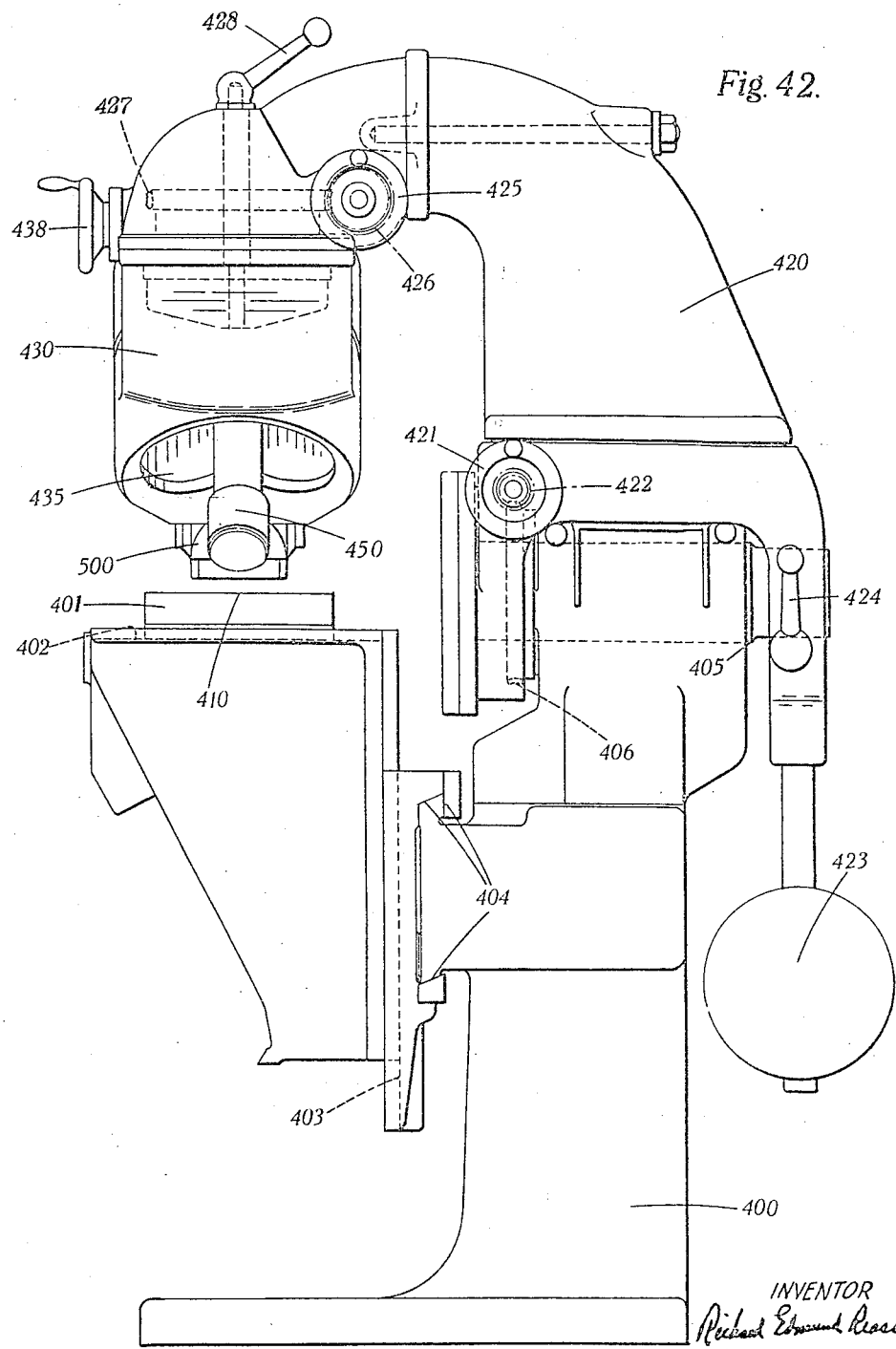

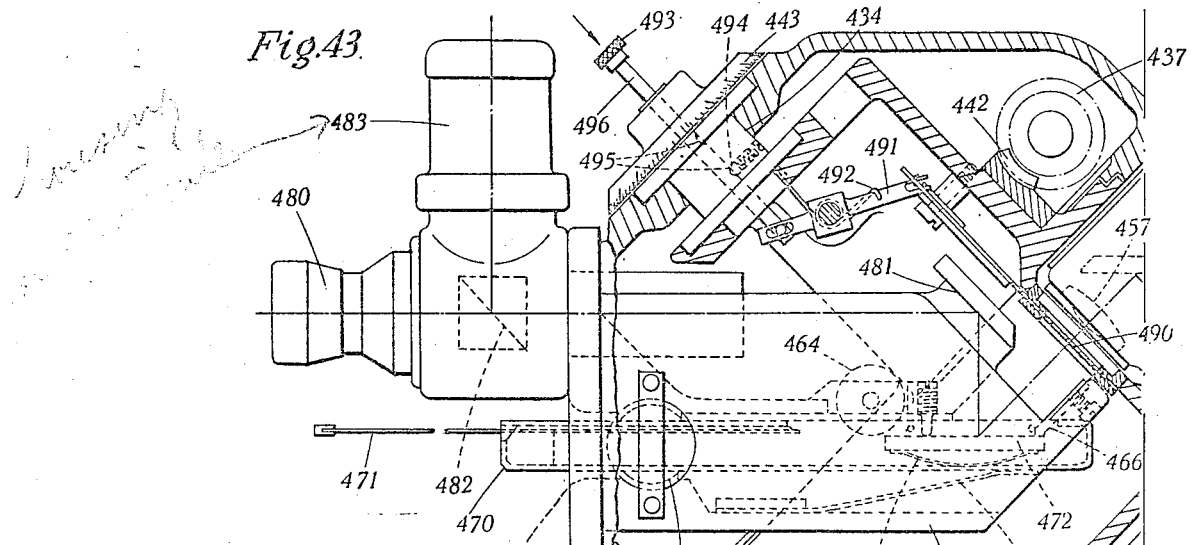
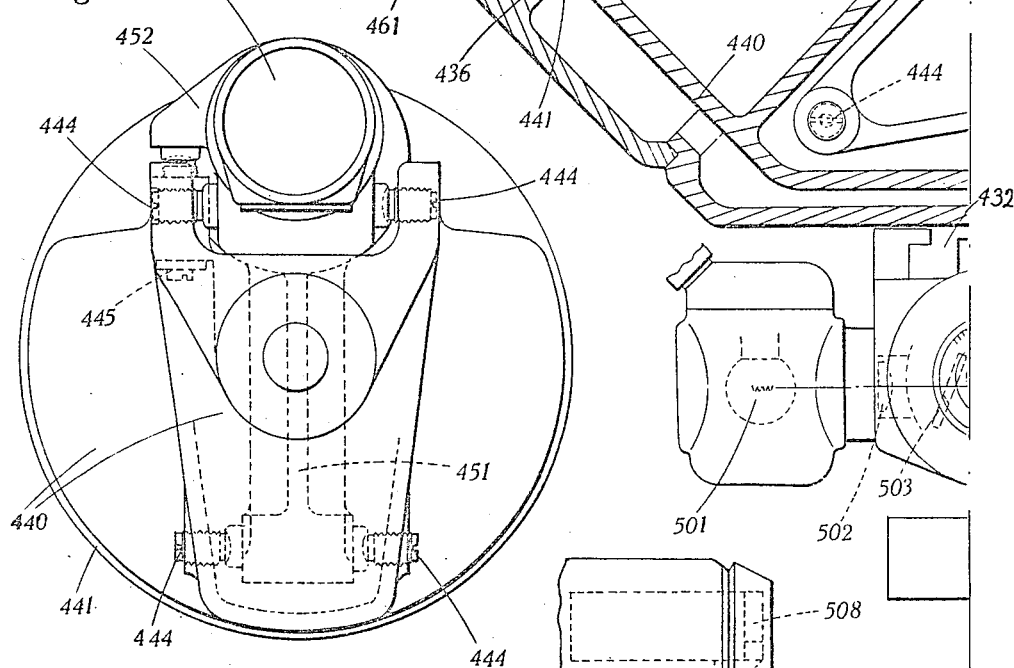
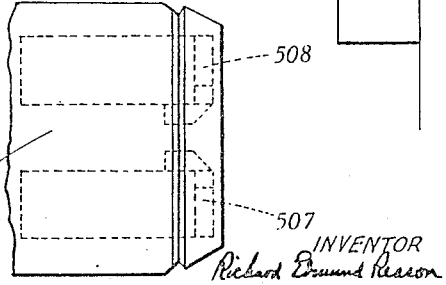

Sept. 16, 1941.          R. E. REASON          2,256,102
OPTICAL MEASURING OR TESTING APPARATUS
Filed June 1, 1938          13 Sheets-Sheet 12
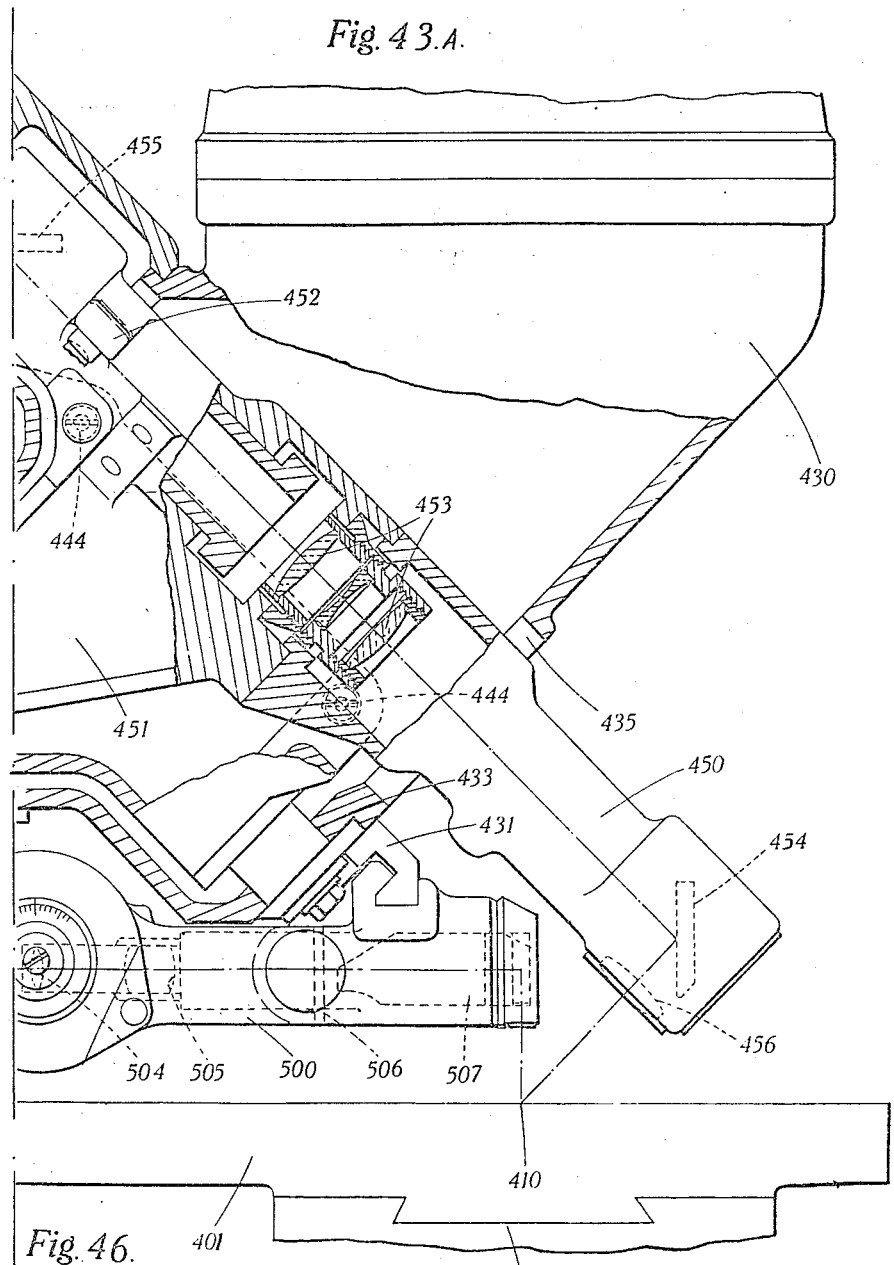
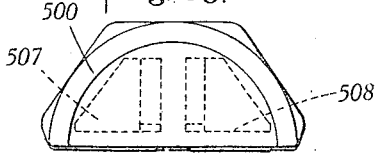
INVENTOR
Richard Edmund Reason
BY
Arthur P. Kent
his ATTORNEY

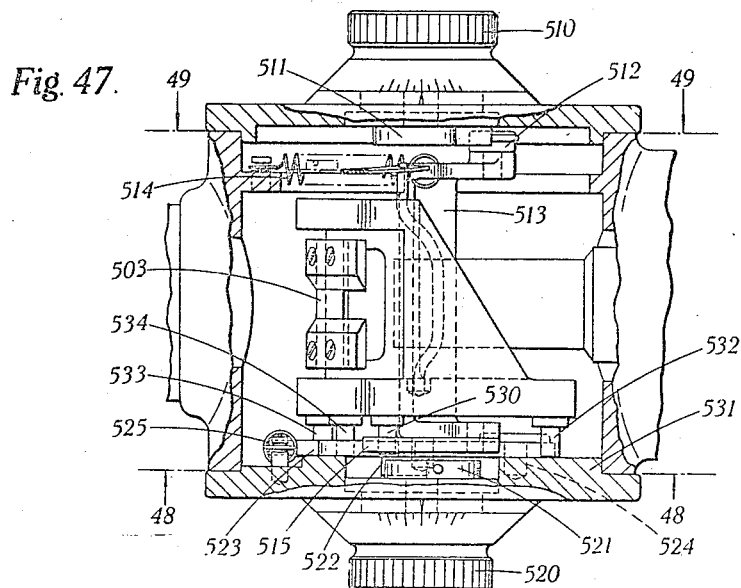
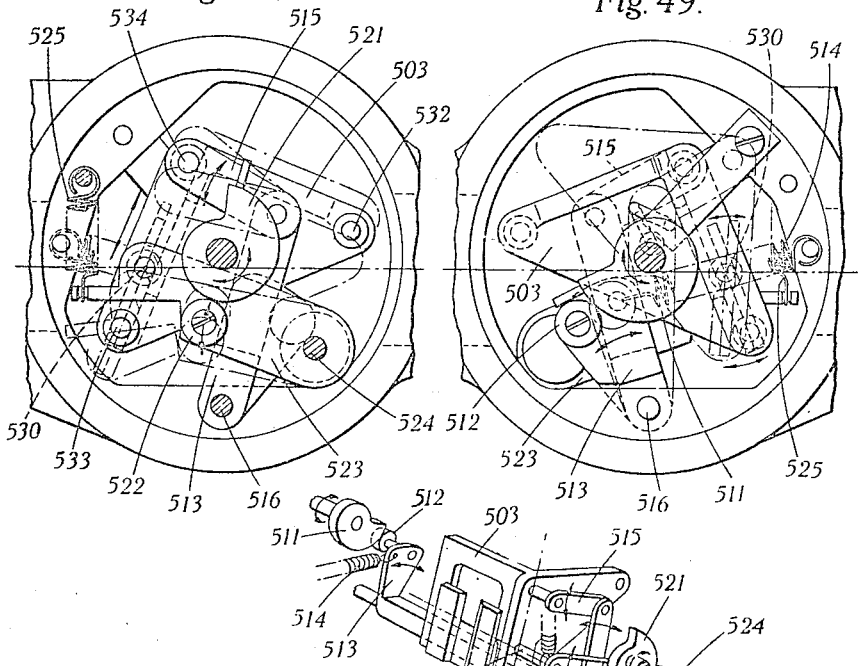

Patented Sept. 16, 1941

2,256,102

UNITED STATES PATENT OFFICE 2,256,102

OPTICAL MEASURING OR TESTING APPARATUS

Richard Edmund Reason, Leicester, England, assignor to Kapella Limited, Leicester, England, a company of Great Britain Application June 1, 1938, Serial No. 211,231
In Great Britain June 2, 1937

25 Claims. (Cl. 88—14)

This invention relates to optical measuring or testing apparatus and more particularly concerned with the measurement or testing of plane section profiles of manufactured articles or of appliances used in their manufacture, such for example as screwthreads or hobs or thread gauges.

Hitherto precision measurement of screwthreads has usually been effected optically by what may be termed "shadow projection," by directing a beam of parallel light at an angle to the axis of the thread equal to the pitch angle, so that a shadow of the thread is thrown on to a screen through a magnifying projecting lens. Such an arrangement will often suffice for simple thread surfaces, but is necessarily limited in its practical application owing to the fact that in many instances other parts of the screwthread or other object under examination are interposed in the path of the beam of light.

The primary object of the invention is to provide an improved optical apparatus for effecting precision measurement or testing, which will be of much more general applicability than the known shadow projection arrangement, and will effect the desired measurement with a very high degree of accuracy. This object is generally achieved in the invention by the employment of means for defining a plane section profile of the object with greater accuracy than hitherto in combination with improved means for optically projecting an image of the profile.

Although the section profile may be defined in other ways, it is preferred to employ for this purpose an illuminating device by means of which a beam of light bounded (at least on one side) by a plane is directed on to the object under examination, the diffused light from the surface of the object being utilised for the optical projection of an image of the profile of the section in which the object is cut by such bounding plane. Whilst it is preferable to project the image of the profile in a direction at right angles to the section plane, this will often be impracticable owing to interference from other parts of the object, and recourse must then be had to oblique projection. In some instances, where only a relatively small degree of obliquity is called for in the projection, satisfactory results can be obtained with the use of a wide angle projecting lens whose optical axis is perpendicular to the section plane and also to the image plane, but in the majority of instances it will be necessary to employ a projecting lens or lens system whose optical axis is oblique to the section plane, and this in its turn introduces difficulties in obtaining an image which is both sufficiently accurate and conveniently arranged for effecting the desired measurements.

A further object of the invention is therefore to provide an oblique projecting arrangement which will give an accurately focussed image and preferably one which will give an image free from the distortion due to the oblique projection.

In some instances it is not possible or convenient to view the whole of a desired section profile from any one viewpoint, and another object of the invention is to provide means whereby images of parts of the profile obtained from separate viewpoints can be accurately correlated with one another.

Although it will usually be more convenient to record the image photographically or to project it on to a diffusing screen, it will sometimes be desired to view the image directly through an eyepiece, and a further object of the invention is so to arrange an oblique projecting device as to facilitate such eyepiece viewing.

For accuracy in definition of the section profile, it is usually preferable to provide an objective in the illuminating device for focussing more or less accurately on the surface of the object an image of a slit or knife edge. It is undesirable, however, to draw on depth of focus to any considerable extent, and a further object of the invention is to provide an illuminating device which will accurately define the profile in cases where the shape of the object is such that the profile diverges very considerably from a straight line.

A more specific object is to provide an adjustable illuminating device whereby accurately focussed definition of the section profile can be obtained with objects of different shape.

A still further object of the invention is to provide means whereby interference with the accuracy and definition of the projected image resulting from direct reflection of the illuminating light from parts of the object surface is reduced to a minimum.

Further objects of the invention will be apparent from the following description of the accompanying drawings, which illustrate a number of alternative constructions according to the invention. In these drawings—

Figure 7:
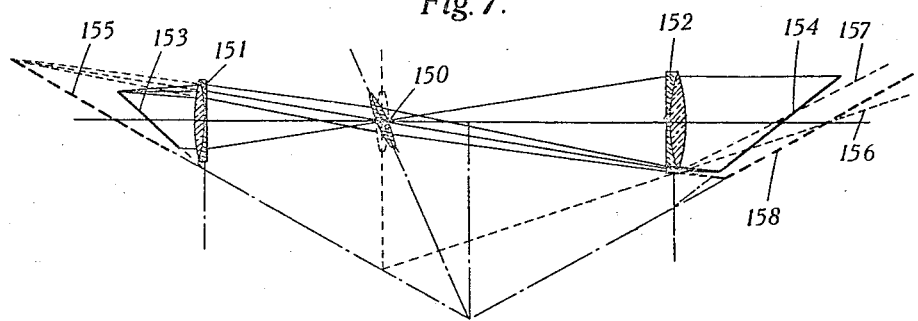
Figure 8:
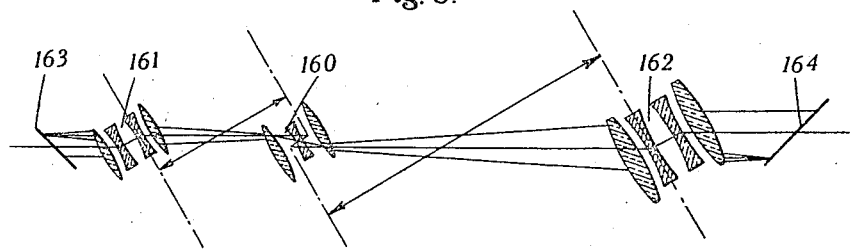
Figure 27:
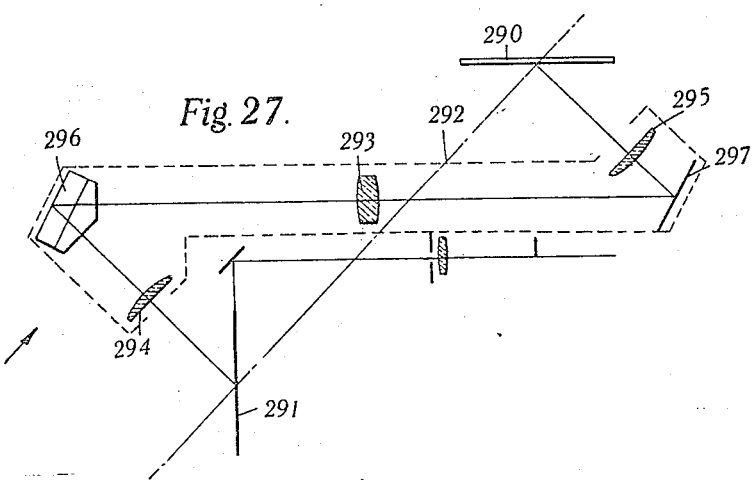
Figure 28:
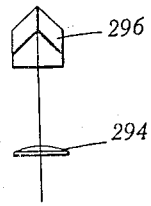
Figure 29:
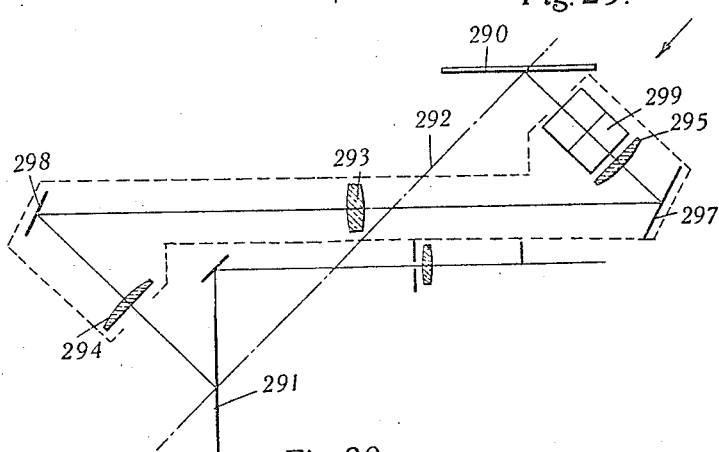
Figure 30:
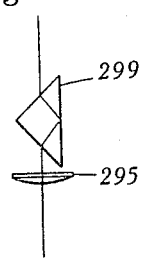
Figure 35:
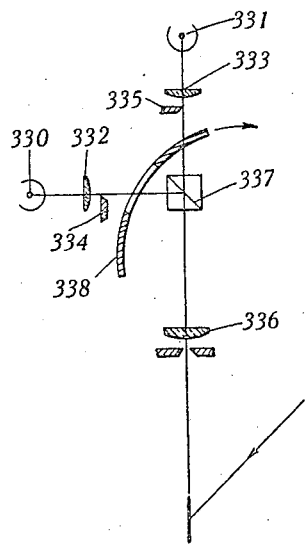
Figure 36:
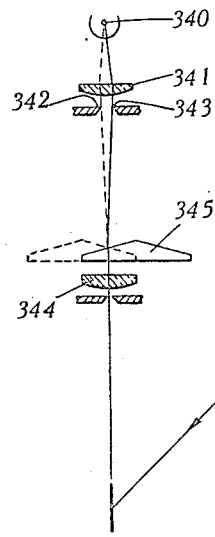
Figure 37:
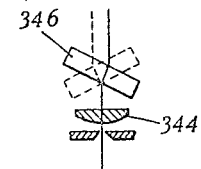
Figure 38:
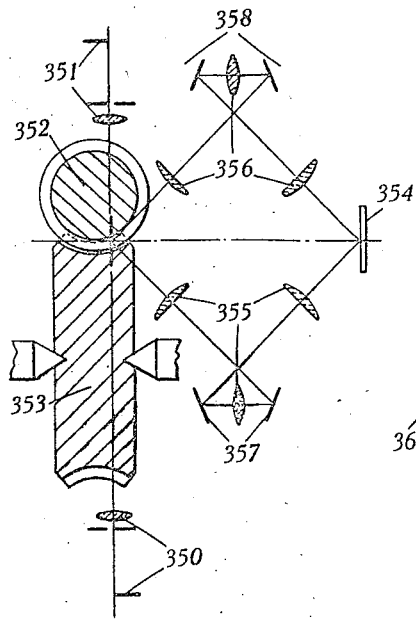
Figure 39:
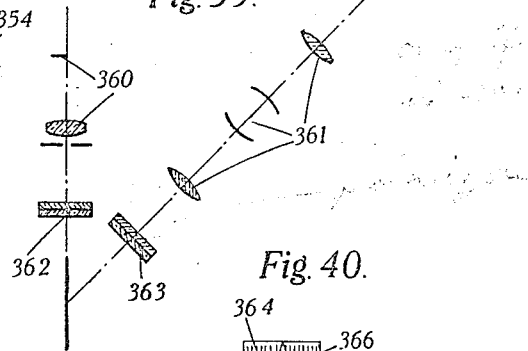
Figure 40:
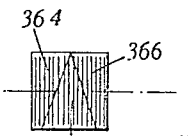

Figure 1 illustrates diagrammatically a simple arrangement in which the section profile is defined by the edge of a shadow cast by a knife edge or mask and is projected obliquely, Figure 2 shows an alternative arrangement employing slit illumination and also means for correcting for the distortion due to the oblique projection, Figure 3 is a modification of the arrangement of Figure 1 wherein the section profile is illuminated by focussing a knife edge approximately on the surface of the object, Figure 4 illustrates means whereby a distorted photographic image obtained with the arrangement of Figure 3 can be reprojected to correct for the distortion, Figure 5 shows an alternative arrangement employing focussed slit illumination with a projecting lens arranged to give a rectified image, Figure 6 illustrates a preferred oblique projecting lens system giving a rectified image, Figures 7 and 8 show modifications of the lens system of Figure 6, Figures 9-12 respectively illustrate four arrangements for direct viewing of an obliquely projected image of the section profile, Figures 13 and 14 respectively show two alternative illuminating arrangements for defining the section profile on the two flanks of a gear tooth or screwthread, Figure 15 illustrates another arrangement for illuminating a portion of a screwthread, Figure 16 is a partial view at right angles of Figure 15, Figures 17 and 18 are two similar views showing a modification of part of the arrangement of Figures 15 and 16, Figures 19-21 illustrate a preferred illuminating arrangement adjustable for use with screwthreads or gear teeth of various shapes, Figures 22-30 illustrate a number of alternative arrangements in which the projecting system of Figure 6 is rotatable to enable the section profile to be viewed from various directions, Figures 28 and 30 respectively being side views of parts of the arrangements of Figures 27 and 29 in the direction of the arrows shown, Figures 31 and 32 show another rotatable projecting arrangement employing the projecting lens of Figure 5, Figure 31 being a section on the line 31—31 of Figure 32, Figures 33 and 34 respectively show two alternative arrangements in which the projecting system of Figure 2 is rotatable, Figures 35 and 36 respectively illustrate two alternative illuminating arrangements especially intended for testing the pitch of a screwthread, Figure 37 shows a modification of the arrangement of Figure 36, Figure 38 illustrates an arrangement for testing the accuracy of meshing of two gear wheels, Figures 39 and 40 show a simple arrangement utilising polarised light and a modification thereof, Figures 41-50 illustrate a preferred practical construction of apparatus according to the invention.

In the simple arrangement of Figure 1, the illuminating device comprises a source of light 100 preferably of small size associated with a condensing lens 101, with or without a concave reflector behind the light source, so that a large percentage of the light from the source is collected and concentrated on a small aperture in a mask 102 at the focus of an objective 103. A beam of parallel light is thus transmitted towards the object, which is shown by way of example as a screwthread 104, and a knife edge 105 is interposed in such beam in a position very close to the surface of the object, so as to cast a sharply defined shadow thereon, the edge of the shadow constituting the section plane, indicated at 106.

The diffused light from the surface of the object on the side of the section plane which is illuminated is used for projecting an image of the profile for examination, and the surface of the object may be whitened or otherwise treated to increase the brightness of the projected image.

Although it would be preferable to project the image in a direction at right angles to the section plane 106, this will seldom be practicable owing to interference from other parts of the object, and Figure 1 shows a simple projecting device for obliquely giving an accurately focussed image of the profile on a flat screen 107 inclined to the section plane. This device comprises a projecting lens 108, whose nodal planes respectively intersect the section plane 106 and the plane of the screen 107 in two parallel lines equidistant from the optical axis of the projecting lens. For simplicity in the drawings, the two nodal planes of the lens are assumed to be coincident. The image on the screen will be sharply focussed, but will suffer from distortion owing to the oblique projection. Accurate measurements can therefore be made of the image on the screen, in order to test the accuracy of the screwthread, but careful calculations will have to be made from the measurements in order to correct for the distortion and obtain the true measurements.

In practice the amount of light available will usually be inadequate for satisfactory projection on to a screen, and it will consequently often be preferable to photograph the image at low magnification, by replacing the screen 107 by a photographic plate, and either to make the measurements on the photograph or on a photographic enlargement thereof or to project an enlarged image of the photograph on to a screen. A convenient arrangement for this purpose will be described below with reference to Figures 3 and 4.

Figure 2 shows an arrangement employing a modified form of illuminating device and also one way of correcting optically for the distortion due to the oblique projection. The illuminating device of Figure 2 differs from that of Figure 1 in that a narrow slit 110 is provided in the parallel beam from the objective 103 in place of the knife edge 105, the slit being disposed nearer the objective. In order that the illuminating device should not interfere with the projecting device, an inclined reflector 111 is disposed between the slit 110 and the object, the object being omitted and the section plane 106 alone indicated, for simplicity.

In this example the projecting device comprises two projecting lenses 112, 113, of which the first serves to project an accurately focussed but distorted image on to a flat diffusing surface 114, in a manner similar to that described with reference to Figure 1, whilst the second serves to reproject the distorted image at such an angle as to correct for the distortion of the image. In general, the distortion will be properly corrected if the direction of reprojection and the final image plane 115 are respectively mirror images with respect to the diffusing surface 114 of the original direction of projection and the section plane 106. Thus in the arrangement illustrated the original projection takes place at an angle of 45° to the section plane 106, the diffusing surface 114 being at right angles to such plane, whilst the reprojection takes place at 45° to the diffusing surface on the other side thereof, the final image plane 115 being parallel to or coincident with the section plane. The magnifications of the two projecting lenses may be made different by mounting them in the appropriate positions, provided that each satisfies the condition that its nodal plane passes through the intersection of its object and image planes. The final image plane 115 may contain either a projection screen or a photographic plate, as desired.

Figure 3 shows an arrangement which differs from Figure 1 in respect of the illuminating device. In this example an objective 120 serves to focus a knife edge 121 more or less accurately on the surface of the object, the objective preferably being provided with a small aperture 122 which may, if desired, be in the form of a narrow slit. The profile in the section plane 106 is projected in the manner described with reference to Figure 1 on to a photographic plate 123. Figure 4 shows a method by which the distortion of the image thus obtained can be corrected by subsequent reprojection of the image at the appropriate angle, and the arrangement is also such as to afford correction for any errors due to lack of flatness in the plate. Thus the image on the plate 123 is reprojected by means of a lens 124 on to a flat screen 125 occupying a position relative to the plate exactly corresponding to that originally occupied by the section plane 106. In order to avoid distortion the plate should be exposed and reprojected from the same centre of perspective, i. e. that nodal point of the projecting lens relating to the plate. A second and preferably enlarged photograph is now taken of the rectified image of the screen 125 in a direction at right angles to the screen by means of a lens 126 on a plate 127. The resultant photographic image will be free from distortion errors due to the oblique projection and also from errors due to lack of flatness in the first plate.

In the arrangement of Figure 5, the illuminating device is generally similar to that of Figure 3, except that the knife edge 121 is replaced by a narrow slit 130, so that the surface of the object is illuminated by a single thin line of light running along the section profile instead of by a band of light having a sharp edge in the section plane. This figure also shows a projecting device giving directly a rectified image free from distortion due to the oblique projection. This device comprises a wide angle projecting lens 131 which has its optical axis perpendicular to the section plane but is displaced to one side of the profile so that the rays pass obliquely through the lens. This lens projects an image of the profile on to a projection screen or photographic plate 132 lying parallel to the section plane. This arrangement, which can be such as to give an enlarged image on the screen, if desired, operates satisfactorily provided that the direction of projection does not make too large an angle with the perpendicular to the section plane. Fairly good results can be obtained when this angle is 40° or less, but for larger angles an appreciable amount of distortion is present in the image with the types of wide angle lens at present available.

Such difficulties are obviated in the preferred oblique projecting device illustrated in Figure 6, which is such as to give an image free from all distortion due to the oblique projection. This projecting device comprises a projecting lens 140 and two collimating lenses 141, 142 spaced apart symmetrically one on either side of the projecting lens. The projecting lens 140 itself is preferably of the anastigmat or rectilinear type and may consist of a divergent component disposed between two convergent components symmetrically arranged, with its nodal points 143, 144 in the air gaps between the components.

The two collimating lenses 141, 142, each of which may consist of an achromatised doublet, are of equal focal length, and the principal focus of each lens coincides with the nodal point 143 or 144 of the projecting lens relating to the space in which the collimating lens lies. Each collimating lens is spherically corrected with respect to such nodal point, and fulfils the sine condition within the angle subtended by the projecting lens. The projecting lens 140 may be corrected to compensate for the aberrations, particularly astigmatism and curvature of field, introduced by the collimating lenses.

The whole system is symmetrical and produces an inverted image at unit magnification, the object and image planes 145, 146 being equally inclined to the optical axis. Slight inequalities in the powers of the collimating lenses may, however, be compensated for by a slightly asymmetrical arrangement, in which the central lens 140 is displaced towards the weaker of the two collimating lenses.

With this arrangement the principal rays from points in the object plane 145 (which will usually be constituted by the section plane) to corresponding points in the image plane 146 are parallel to the optical axis in the spaces outside the collimating lenses, and it will be clear that this condition ensures that a rectified image free from distortion due to the oblique projection will be obtained. Such an image can be satisfactorily enlarged by means of ordinary enlarging apparatus having its axis perpendicular to the image plane, provided that the surface of the plate or screen on which the image is projected is a true flat surface.

It is not essential to the system to employ a projecting lens between the two collimating lenses, and such lens can be omitted altogether if the object and image planes pass respectively through the foci of the two collimating lenses. The provision of the central lens, however, has the advantage of bringing the two planes closer together, and this in turn facilitates correction of the aberrations.

This arrangement has the property (when unit magnification is employed) that the object and image planes can be moved equal distances in the same direction relatively to the lens system within limits determined by the positions of the collimating lenses, without disturbing either focussing or magnification. The system will also act to remove substantially all distortion due to oblique projection. In view of these advantages it will usually be preferable to employ unit magnification in the manner described, but it will be appreciated that in some instances it will suffice to remove only "keystone" distortion (i. e. the distortion such that a square in the object plane with two sides parallel to the line of intersection of the object and image planes will be imaged as a trapezoid in the image plane), and to depart from unit magnification leaving "rectangular" distortion in the image (i. e. the distortion such that the said square will be imaged as a rectangle with two sides parallel to the line of intersection of the two planes). This may be done by using collimating lenses of different focal length or by displacing the central lens from the centre of the system so that it adds to the power of one of the collimating lenses, provided that afocal adjustment is maintained. In this case the necessary angular relationship to ensure accurate focussing at the desired magnification is that the ratio of the tangent of the angle between the object plane and the optical axis to that between the image plane and the optical axis should be equal to the magnification of the system. As has been mentioned, this modified arrangement will give an image suffering from rectangular distortion, which can, however, be compensated for by the use of an anamorphotic enlarging system, including one or more cylindrical lenses. Even without such compensation, a rectangularly distorted image may itself be adequate, for example in cases where the relative dimensions in the undistorted direction alone are of interest.

Figures 7 and 8 show modifications of the oblique projecting system of Figure 6, wherein a rectified image free from keystone and rectangular distortion can be obtained at magnifications other than unity. This is achieved by the use of tilted lenses.

The simple arrangement of Figure 7 comprises a projecting lens 150 and two collimating lenses 151, 152 of different focal length, one on either side thereof. The collimating lenses are so spaced from the projecting lens that their principal focal points are approximately coincident with the nodal points of the projecting lens. Each collimating lens is mounted square to the optical axis of the system, i. e. with its optical axis coincident with such axis, and the projecting lens is tilted at such an angle to the axis that the object, which lies in a plane 153 inclined to the optical axis, is imaged in a plane 154 equally inclined to the axis.

The angle of tilt of the projecting lens 150 necessary to produce this result, can best be explained by first considering the conditions which would arise if the projecting lens were not tilted (as indicated in dotted lines). In such a case the plane 155 containing the first virtual image (i. e. the virtual image of the object formed by the first collimating lens 151) and the plane 156 containing the second virtual image (i. e. the image of the first virtual image which is formed by the projecting lens 150 and from which the final real image 157 is formed by the second collimating lens 152) intersect in the nodal plane of the projecting lens. Tilting of the projecting lens about its nodal point will not substantially alter the position of the point of intersection of the second virtual image 156 and the optical axis, and the effect of such tilting will be to rotate the second virtual image about such point of intersection into a plane 158 at the same inclination to the optical axis as the plane 155 of the first virtual image, thereby tilting the final real image from the plane 157 into the plane 154 which is inclined to the optical axis at the same angle as the object plane 153, the proportions in the object and image spaces preferably being geometrically similar to one another.

In practice the arrangement of Figure 7 will require modification in order to provide correction for spherical and other aberrations. For this purpose the projecting lens 150 is preferably of the anastigmat or rectilinear type and may consist of a divergent component between two convergent components symmetrically arranged, with its nodal points in the air gaps between the components. In view of the tilting of the lens, the two parts of the optical axis of the system on opposite sides of it, will be parallel to one another respectively through the two nodal points, and each part of such axis will coincide with the optical axis of the corresponding collimating lens. The collimating lenses, which may each consist of an achromatised doublet, and the projecting lens are preferably corrected in a manner similar to that described with reference to the arrangement of Figure 6. Since with this arrangement the principal rays in the object and image spaces are parallel to the optical axis, it will be clear that a rectified image free from distortion will be obtained.

This arrangement may be modified by tilting the collimating lenses, either instead of or as well as the projecting lens. In such a modification the two collimating lenses should be tilted through the same angle in order to avoid keystone distortion, and in one convenient arrangement, as shown in Figure 8, all three lenses 160, 161, 162 are equally tilted. In this case, the collimating lenses 161, 162, if tilted through an appreciable angle, should have the form of anastigmatic lenses, special regard being paid to the correction of the aberrations within the field subtended by the projecting lens. The focal lengths of the collimating lenses are measured normally to their nodal planes from the corresponding nodal points of the projecting lens, or in other words their principal focal points lie in the corresponding nodal planes of the projecting lens. The nodal point of the projecting lens corresponding to a collimating lens need not be the nodal point nearer to such lens, and in the example illustrated the nodal points are crossed. The arrangement of Figure 8 has the advantage that appreciable magnification can be obtained without excessive tilting of the lenses, the object and image planes 163, 164 being again equally inclined to the optical axis of the system which is displaced parallel to itself in its passage through each lens owing to the separation of the nodal points of the lens.

The foregoing rectifying oblique projecting systems are suitable for projecting the image of the section profile on to a photographic plate or a projection screen, but not for direct viewing of the profile through an eyepiece owing to the fact that the image plane is inclined to the optical axis. The systems can, however, be extended to suit direct viewing in a variety of ways and Figures 9–12 show four alternative arrangements of this kind.

Figure 9:
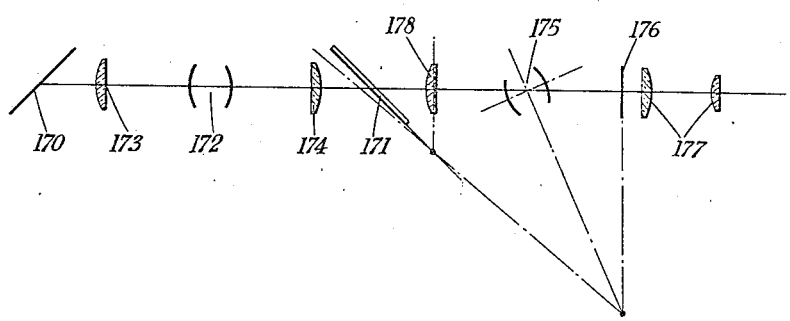

In the arrangement of Figure 9, a rectified image of the section profile 170 is obtained in an inclined image plane 171 by means of an oblique projecting lens system 172, 173, 174 arranged in the manner of Figure 6, and a further projecting lens 175 acts to produce a further image of such rectified image in a plane 176 square to the optical axis of the whole system, so that such final image can be directly viewed through an eyepiece 177. It will be appreciated, however, that the final image, although accurately focussed in a plane square to the axis, will be distorted, and in order to enable accurate measurements to be made on the image, notwithstanding such distortion, a graticule is provided in the first image plane 171, so that the profile and the graticule are equally distorted in the final image. Since it would in practice be rather disturbing to attempt to make measurements on an image suffering from keystone distortion, it is preferable to provide a collimating field lens 178 between the first image plane 171 and the projecting lens 175, so that the final image will suffer only from rectangular distortion. The provision of the collimating field lens 178 is also convenient in that it contributes somewhat towards the formation of the final image and can be corrected in association with the tilted projecting lens 175.

Figure 10:
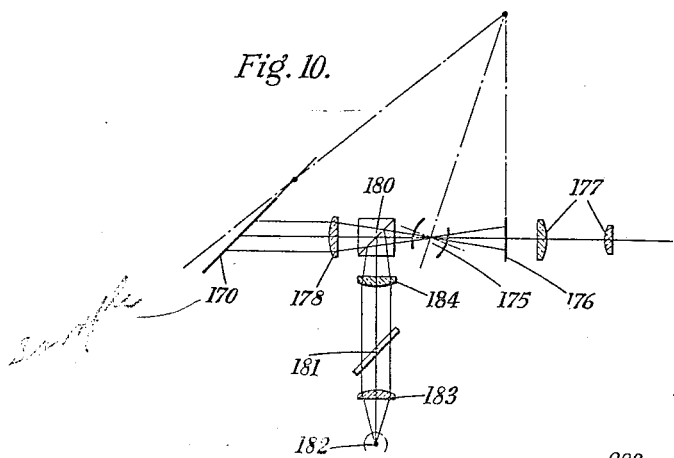

Figure 10 shows a modification of the arrangement of Figure 9, in which the rectifying projecting lens system 172, 173, 174 is omitted, the superimposition of the graticule on the section profile in the observed image being obtained by means of a semi-transparent inclined reflector 180 disposed between the section plane and the tilted projecting lens 175. The graticule is disposed in a plane 181, which is the image of the section plane in the reflector 180, and is illuminated by a source of light 182 associated with a condenser 183. If the collimating field lens 178 is employed, it may be located between the reflector and the section plane, in which case a second and similar collimating field lens 184 should be provided between the reflector and the graticule. This arrangement has the advantage over the arrangement of Figure 9 that it reduces the number of images and correspondingly improves the definition of the final observed image, which however is still a distorted image.

Figure 11:
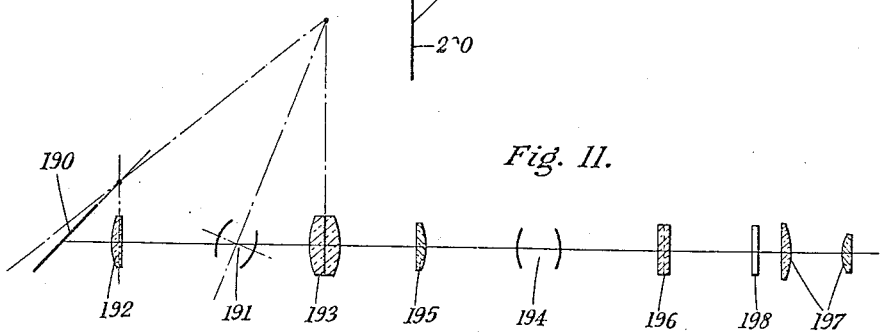

Figure 11 illustrates a more complicated system for producing a rectified image for direct viewing. In this example a rectangularly distorted image of the section plane 190 is obtained square to the optical axis by means of a tilted projection lens 191 in conjunction with a collimating field lens 192 in a manner analogous to that described with reference to Figures 9 and 10, and a sphero-cylindrical field lens 193 is disposed at the image point. The rectangular distortion in the image is then corrected by means of anamorphotic system comprising a central objective 194 having spherical surfaces and two cylindrical lenses 195, 196 one on either side of the objective 194 and equally spaced therefrom. The two cylindrical lenses have their axes at right angles to one another and the equivalent focal lengths in the two meridians are the same, so that the images formed in the two meridians are coplanar, but the nodal planes are displaced in opposite directions with the result that the system magnifies in one direction and reduces inversely in the other direction. By making the magnification equal to the square root of the ratio of the sides of the distortion rectangle to be corrected, a true rectified image will be obtained for viewing through the eyepiece 197. A graticule 198 may be provided in the final image plane.

Figure 12:
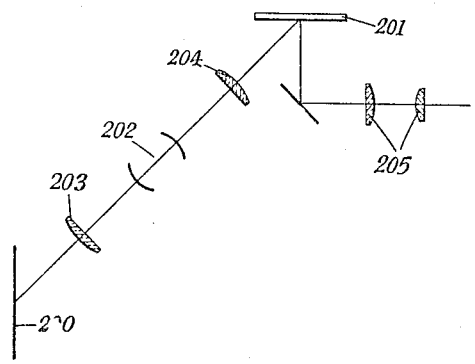

A simpler arrangement for obtaining a rectified image which can be viewed through an eyepiece is shown in Figure 12. In this example a rectified image of the section profile 200 is obtained on a suitable diffusing surface 201 by means of an oblique projecting system 202, 203, 204, similar to that of Figure 6, and this image is directly viewed through an eyepiece 205.

It will be appreciated that the direct vision systems of Figures 9-12 can all be modified, if desired, for enlarged projection on to a screen by providing a suitable projecting lens of wide aperture in place of the eyepiece.

It will be appreciated that the alternative forms of illuminating device shown in Figures 1-5, as also the forms now to be described with reference to Figures 13-21, can be interchanged with one another, as may be desired, for use with any chosen projecting or direct vision device.

The illuminating devices so far described are more especially suitable for use with objects for which the section profile does not diverge to any considerable extent from a straight line. For precision measurement, for example, of screwthreads or gear teeth, however, it will usually be preferable to take into account the shape of the surface of the object and to provide an illuminating device especially suited to such shape in order the more sharply to define the section profile, and Figures 13-21 illustrate a number of alternative forms of illuminating device for this purpose.

Figure 13 shows an illuminating device formed in two parts each associated with a straight line (or approximately straight line) portion of the section profile, the two portions of the profile being at an angle to one another. In the example illustrated the two portions in question are assumed to be the two flanks 210, 211 of a tooth of a thread or gear wheel. The illuminating device comprises two objectives 212, 213 respectively for focussing two slits or knife edges 214, 215 on the flanks 210, 211 of the tooth, the slits or knife edges being illuminated by sources of light (not shown) arranged in the manner described with reference to Figure 3 or Figure 5. The section plane is in this instance the plane of the paper and the two slits or knife edges both lie in the plane parallel to the corresponding tooth flanks. The optical axis of each objective will be perpendicular to the appropriate flank, if practicable, but more usually it will be necessary for it to be inclined at a small angle to such perpendicular, as shown, the objective being in the form of a wide angle lens.

When the available direction of illumination is steeply inclined to the perpendicular to the tooth flank, it will not be practicable to employ a wide angle lens, and in such a case the slit or knife edge should be inclined to the tooth flank with the nodal plane of the objective passing through the intersection of the slit or knife edge with the flank. Such an arrangement is shown in Figure 14, where the two slits or knife edges 216, 217 are in a straight line with one another (and may be continuous with one another) and are focussed on the tooth flanks 210, 211 by means of appropriately tilted objectives 218, 219.

Figures 15 and 16 show a further variant suitable for illumination of a number of non-collinear parts of the profile such for example as a series of teeth of a thread 220. In this instance it is not essential for the parts of the profile to be straight lines. This arrangement employs a knife edge 221 shaped approximately to suit the shape of the profile, an image of the knife edge, illuminated by a source 222 and condenser 223, being focussed by a single optical system on the surface of the object. Since the individual parts of the knife edge and profile are inclined to the optical axis of the system, it is preferable to employ a rectifying oblique projecting system to ensure accurate focussing on the object surface, and to this end the optical system 224, 225, 226 is arranged in the manner already described with reference to Figure 6. Some slight degree of adjustment of the central lens 224 along its optical axis is permissible to vary the magnification in accordance with any error, for example in pitch, in the object. In the arrangement shown in Figures 15 and 16 the knife edge 221 is made by bending sheet metal to the required shape and cutting it off in a plane. It will be appreciated, however, that the knife edge can be made in other ways, as for example by milling from the solid. Figures 17 and 18 illustrate such a modification, wherein a knife edge 227 is obtained by cutting a solid counterpart of the object, for example a nut if the object is a screwthread, in the appropriate plane and polishing the cut surface. This polished surface acts as a reflector to replace the portion of the cone of light, which is cut off by the solid body of the cut counterpart and whose loss would tend to cause an unsatisfactory image of the knife edge on the surface of the object.

It will be appreciated that a knife edge shaped, as in the arrangements of Figures 15-18, to suit the shape of the section profile may be employed in the shadow illumination arrangement of Figure 1 in place of the simple straight knife edge 105 therein and will give more satisfactory definition of the profile.

Figures 19-21 show a preferred form of illuminating device for use for such purposes as examining gear teeth or screwthreads, by means of which the two flanks of a tooth can be simultaneously illuminated, the device being adjustable to suit teeth of different angle and size. In this arrangement two knife edges 230, 231 constituted by the two sides of a narrow slot cut in a flat piece of metal are illuminated by a source 232 and condenser 233 and are focussed by means of an objective 234 in conjunction with a collimating lens 235 and suitable plane reflectors on the two flanks 236, 237 of a tooth on the object. The reflectors are symmetrically arranged with respect to a plane, which passes through the optical axis at right angles to the section plane and which also passes through the slot midway between the two knife edges 230, 231, and may be constituted by the faces of a prism or prisms or by separate reflectors. It will be assumed for convenience of description that the section plane and the plane of symmetry are both vertical (so that Figure 19 is a horizontal section and Figure 20 a vertical section whilst Figure 21 shows the reflectors in end elevation) although it will be appreciated that the device may in practice be otherwise arranged.

The rays from the knife edge 230 are reflected at a vertical reflecting surface 238, inclined to the optical axis so that they pass out generally horizontally at right angles to the optical axis, and are then reflected downwards and inwards by a further reflecting surface 239 to define the part 240 of the section profile on the tooth flank 236. The rays from the other knife edge 231 are similarly reflected, on the other side of the optical axis, at surfaces 241 and 242 to define the part 243 of the profile on the tooth flank 237. In order to prevent confusion which might otherwise occur from the imaging of both knife edges on each tooth flank, a mask 244, which may consist of a vertical wire, is disposed between the objective 234 and the reflectors in order to soften the definition of the undesired image without affecting that of the desired image 240 or 243. A similar effect could alternatively be obtained by suitably chamfering the edges of the reflecting prisms. The two knife edges will thus be accurately focussed on the tooth flanks to define the section profile, provided that they occupy the correct position and inclination with respect to the optical system.

The vertical chain line 245 in Figure 21 through the point of intersection of the two images 240, 243 is itself the image of the oblique chain line 246 in Figure 20 through the base of the slot forming the knife edges. It will be clear therefore that if the slotted plate is moved parallel to itself along the line 246, the point of intersection of the images 240 and 243 will move along the line 245, the images remaining parallel to themselves, and such translational adjustment of the plate will thus constitute the adjustment necessary to suit a tooth of the same angle but of different size. In a similar way rotation of the plate about the base of the slot, where it is intersected by the line 246, will have the effect of altering the inclination of the two images 240, 243 to one another without moving their point of intersection, thus accommodating teeth of different angle. The device can thus be adjusted to any required angle or size of tooth having straight flanks. Usually the flanks of a tooth will be straight or very nearly so, so that depth of focus will adequately cover slight divergences, but for special cases where the flanks are considerably curved, the knife edges may be likewise curved (in the plane of the paper in Figure 20) whilst remaining parallel to one another.

Difficulty arises in many instances in connection with the projection of the section profile from the fact that it is impossible to view the whole profile from any one viewpoint owing to obstruction of the view by other parts of the object under examination. Figures 22-34 show a variety of arrangements in which this difficulty is avoided by mounting the projecting device so that it can be rotated to enable the profile to be viewed from separate viewpoints, the arrangements being such that the separate partial images of the profile thus obtained are accurately correlated with one another. The arrangements are especially useful when the profile image is received photographically, for it then becomes possible to build up the complete profile by two or more exposures of the same plate taken in different positions of the projecting device.

In one arrangement, illustrated in Figure 22, the complete projecting device 250, 251, 252, which is of the kind described with reference to Figure 6, together with a photographic plate 253 in the image plane, is mounted for rotation within suitable angular limits about an axis indicated in chain line at 254 suitably inclined to the optical axis of the projecting device. Conveniently the axis 254 is at right angles to the optical axis and at 45° to the section plane 255 and passes through the intersection of the optical axis with the section plane. In the normal position of the apparatus, as shown, the section plane, the image plane and the plane containing the optical axis and the axis of rotation are mutually perpendicular, so that in this position the image plane is inclined at 45° to the optical axis. In order, however, to maintain the image stationary and sharply focussed on the plate 253 during the rotation, it is necessary for the plate itself to be rotated about a secondary axis relatively to the optical axis during the rotation of the optical axis about the main axis of rotation 254. This can be achieved by employing for this moving secondary axis a line 256 perpendicular to the optical axis through the point of intersection thereof with the image plane, the rate of rotation of the plate about the axis 256 (relatively to the optical axis) being made equal to that of the system about the main axis 254 by means of suitable interconnecting gearing. With this arrangement a photograph of part of the profile can be taken in one position of the system and then a photograph of another part by exposure of the same plate in a new position, and so on until a composite photograph of the complete profile has been obtained. The illuminating device shown by way of example as of the kind described with reference to Figure 3 is indicated at 257.

This arrangement can be modified by employing a main axis of rotation not at right angles to the optical axis. In this case the secondary axis will be coplanar with the main axis and will be inclined to the optical axis at the same angle as the main axis. Thus when the main axis is at right angles to the section plane, the secondary axis will be at right angles to the plate, and when the main axis lies in the section plane the secondary axis will lie in the image plane.

It will usually be more convenient, however, to employ a stationary photographic plate, and this can be achieved in a variety of ways by incorporating reflecting devices into the rotating optical system.

In one such arrangement, shown in Figure 23, the photographic plate 260 is fixed at right angles to the section plane 261 and the axis of rotation 262 passes through the plate and the section plane at 45° to each. The optical system includes, in addition to the three lenses 263, 264, 265, two plane reflectors 266, 267 each of which deflects the optical axis through a right angle, so that the optical axis intersects the section plane and the plate in the same points as the axis of rotation. The illuminating device is indicated at 268.

This arrangement may be modified, if desired, as shown in Figure 24 by turning the plate 260 through a right angle so that it is parallel to the section plane 261, and adding an additional reflector 269 at one of the corners. In this way an image erect in a direction parallel to the plane of the drawing and inverted in a direction at right angles thereto is obtained to suit the relative directions of rotation of the section plane and plate with respect to the optical axis.

In another arrangement, shown in Figure 25, the plate 270 is coplanar with the section plane 271 and the axis of rotation 272 also lies in such plane. The optical axis of the projecting lens system 273, 274, 275 leaves the section plane at 45°, is deflected by a reflector 276 back again parallel to such plane, and is deflected again by another reflector 277 to meet the plate at 45°. The image in this case is completely inverted. The illuminating device is shown at 278.

In the arrangement of Figure 26, the plate 280 is parallel to the section plane 281 with the axis of rotation 282 perpendicular to both, the optical axis of the lens system 283, 284, 285 intersecting both planes at 45° with two intermediate reflections at 286 and 287. The image is again completely inverted.

In all these arrangements it has been assumed that the illuminating device will adequately illuminate the whole section profile, and it will be realised that in some instances more than one illuminating device or alternatively a movable illuminating device will be required to illuminate the particular part of the profile being projected.

The arrangement of Figure 26 has the advantage that a single illuminating device 288 can be employed which is movable with the projecting device, since the axis of rotation 282 is perpendicular to the section plane.

The requirements as to erection or inversion of the image depend on the relative directions of rotation of the section plane and the plate with respect to the optical axis, and arrangements other than those above mentioned may be employed. Since it is more convenient for rectifying purposes for the lens system itself to give an inverted image, the requisite further inversions in individual cases are provided by the reflectors, and in some instances special reflectors such as Dove's prisms or roof prisms are required.

Thus in the case (shown in Figures 27 and 28) of a stationary plate 290 perpendicular to the section plane 291 with the axis of rotation 292 at 45° to both, the optical axis of the lens system 293, 294, 295 may leave the section plane at right angles to the axis of rotation 292 and after crossing such axis may approach the plate at right angles to the axis. In this case it is necessary for the image to be inverted in a direction parallel to the plane of the drawings and erect in a direction at right angles thereto. This is achieved by providing a roof prism 296 at one of the corners and a plane reflector 297 at the other corner. A similar result can also be obtained as shown in Figures 29 and 30 by replacing the roof prism 296 by a plane reflector 298 and inserting a Dove's prism 299 at a convenient point in the ray path.

In the arrangements of Figures 22–30 the desired rectification of the image has been obtained by means of the lens system of Figure 6, but other rectifying arrangements may be employed, if desired.

Thus Figures 31 and 32 show an arrangement in which a wide angle lens 300 is employed, the section plane 301 and the photographic plate 302 being parallel to one another and to the nodal plane of the lens. In this case the lens 300 and the plate 302 are mounted on a frame 303 rotatable about an axis 304 at right angles to the section plane. In order to correlate the partial images with one another in this case it is necessary for the plate, during its rotational movement about the axis 304, to remain in the same orientation in its plane. This can be achieved by a simple parallel link mechanism, consisting in the example illustrated of a link 305 connecting a point on the plate carrier 306 (which is itself rotatable in the frame 303) to a fixed point, the dimensions of the parts being such that the link 305 always remains parallel to the line joining the main axis of rotation 304 with the secondary axis of rotation of the plate carrier 306.

Figure 33 shows an alternative arrangement using a wide angle lens 310, wherein by the use of reflectors 311, 312, which are rotatable with the lens 310 about an axis 313 intersecting the section plane 314 and the plate 315 at right angles in points which are images of one another, it becomes possible to employ a stationary plate.

Figure 34 illustrates an arrangement in which a rectifying projecting system similar to that of Figure 2 is mounted rotatably. In this example the section plane 320, the plate 321 and the intermediate diffusing screen 322 are all parallel to one another. The two projecting lenses 323, 324, and two pairs of reflectors 325, 326 and 327, 328 associated therewith are all rotatable as a unit about an axis of rotation 329 which intersects the section plane 320, the plate 321 and the screen 322 at right angles in points which are images of one another. This arrangement permits the use of a stationary plate.

The apparatus according to the invention is especially applicable to the precision measurement of section profiles of screwthreads, worms, toothed gear wheels and the like, and the manner in which the various alternative illuminating and projecting arrangements above described can be applied to such purposes will be readily apparent without detailed further description. Most commonly the profile to be measured in the case of a screwthread or worm will be that defined by a section plane through the axis thereof, whilst for toothed gear wheels the section plane will usually be at right angles to the axis. The arrangements, however, can readily be applied to the case of a section plane inclined to the axis, as for example a so-called "normal" section plane inclined to the axis at the pitch angle of the thread or worm or the helix in the case of helical toothed gear wheels. For such use it may be convenient to mount the illuminating device so that it can be rotated through measured angles about its own optical axis, the device first being set with the section plane parallel (or perpendicular) to the axis of the thread or worm (or helical gear wheel) and then being rotated through the correct angle to define the normal section. For bevel wheels and spiral bevel wheels two separate rotational movements will be most convenient. Thus the device can first be set with the section plane parallel to the shoulder of the bevel wheel and then rotated first about an axis in the section plane perpendicular to the wheel axis through the pitch angle of the wheel, after which a further rotation about an axis in the section plane perpendicular to the first axis through the spiral angle will bring the device into the appropriate position. Corresponding angular adjustment of the projecting device will, of course, also be required in such cases.

For the measurement or testing of the pitch of a screwthread or the like, two or more turns of the thread may be projected in one or other of the ways above described and their axial separation measured on the projected image. It will usually be more accurate, however, to employ what may be termed a "null" method of measurement, by first projecting an image of one tooth and then moving the thread through an axial distance (which should be equal to the pitch or a multiple thereof) until the image of another tooth accurately occupies the same position as the first image. When a photographic plate is used, the plate can be maintained in position during movement of the thread through the correct pitch distance and re-exposed so that the two images are superimposed on the plate, the accuracy of such superposition being a test of the accuracy of the pitch of the thread. It will usually be more satisfactory in this case to reverse the second image, so that the pitch accuracy can be tested in accordance with the accuracy of meshing of the two images. Such image reversal can be readily obtained by using an illuminating device with a knife edge which illuminates the area on one side of the section plane, and by rotating such device through 180° about its own axis between the two exposures of the plate. The same effect can be obtained in other ways without moving the whole illuminating device, as illustrated for example in Figures 35–37.

In the arrangement of Figure 35, a double illuminating device is used comprising two sources of light 330, 331, each with a condenser 332 or 333 and a knife edge 334 or 335, a single objective 336 being used to focus one or the other of the two knife edges on the surface of the object. A semi-transparent reflecting surface 337 is provided to enable either knife edge to be imaged by the objective, and the selection of the knife edge to be used is effected by means of a rotatable shutter 338. The arrangement is such that, with the knife edge 334 operative, one side of the section plane is illuminated, whilst the other side thereof is illuminated when the knife edge 335 is operative.

In the arrangement of Figure 36 a single source of light 340 with its condenser 341 is used in conjunction with two knife edges 342, 343 constituted by the two sides of a slot, an objective 344 being used to focus the knife edges on the surface of the object. A sliding double wedge 345 of appropriate wedge angle is provided between the slot and the objective, and the arrangement is such that, when one part of the wedge is operative, one knife edge determines the section plane, the light through the slot illuminating one side of such plane, whilst movement of the wedge gives a displacement equal to the width of the band of light through the slot and thus brings the other knife edge into the section plane, with consequent illumination of the other side of such plane. The sliding wedge may be replaced, as indicated in Figure 37, by a tilting block 346, or by any other form of deviator.

The invention is also applicable to the examination as to whether two cooperating objects, for example a worm and a worm wheel, will properly mesh with one another. This may be carried out, as illustrated in Figure 38, by providing two illuminating devices 350, 351 with coplanar knife edges to give illumination in opposite directions. One of these devices 350 is used for illumination of the worm 352, with the worm wheel 353 removed, and the other 351 for illumination of the worm wheel with the worm removed, care being taken to effect removal of each element without disturbing the other element. In some instances sliding centres and carriers fixed to the elements will suffice for this purpose, whilst in other cases it may be desirable to provide two removable beds each having bearing brackets in which the elements can be turned and clamped. The projection of the two images can be effected in various ways, as for example by employing one or other of the rotatable projecting arrangements above described, or as shown in Figure 38 by the use of a double fixed projecting device. In this device the plate 354 is parallel to the section plane and two rectifying projecting systems 355, 356 of the kind shown in Figure 6 are provided symmetrically one on either side of the common perpendicular to the section plane and the plate. Pairs of reflectors 357 and 358 are provided in the two systems.

The various arrangements described can be applied to a variety of other uses as will readily be apparent without further description.

It has been mentioned above that it is in all cases the diffused light from the surface of the object that is used for the projection and that whitening or other treatment of the surface is desirable to increase the brightness of the image.

This will not in all cases be practicable, and a difficulty may sometimes arise that the light reflected from certain other parts of the surface will be bright and will enter the projecting system, thus seriously interfering with the less bright diffused light used for the projection of the image itself. This difficulty may be obviated by polarising the illuminating beam and providing a crossed analyser in the projecting beam, so that the reflected light, which is still polarised, will be cut out and the diffused light which is depolarised by the diffusion will be transmitted. Such an arrangement is generally applicable to all the alternative forms of illuminating and projecting device above described, and it will suffice to describe its use in one example only of the arrangements. One such example is illustrated in Figure 39, namely one employing an illuminating device 360 similar to that of Figure 3 in conjunction with a projecting device 361 similar to that of Figure 6. Whilst any form of polarising device may be used provided that it is not such as adversely to affect the definition of the image, it will usually be preferable to employ a device having parallel entrance and exit faces which transmit either the ordinary ray or the extraordinary ray without deviation. One form of polarising device which is especially convenient for the present purpose consists of a layer of crystals of an organic (or inorganic) compound, such for example as dichroic crystals of herapathite, embedded in gelatine between two glass plates. The optic axes of these crystals are all made parallel to one another in the process of manufacture. One such device 362 is provided in the illuminating device between the objective and the object, and a second such device 363 is provided in the projecting device between the object and the first collimating lens. The two devices 362, 363 are so oriented that their directions of polarisation are at right angles to one another, so that the second device cuts off all rays from the object which still remain polarised by the first device. Allowance should be made in adjustment of the optical systems for the thickness of the glass plates.

Figure 40 shows an alternative known form of polarising device which is also suitable. This device is a modified form of an Ahrens prism, and consists of a triple prism cut from a rectangular block of spar, the three wedges 364, 365, 366 being cemented with balsam.

A preferred practical construction of apparatus is illustrated in Figures 41–50, this construction embodying the illuminating device of Figures 19–21, the rotatable projection device of Figure 23 which includes the rectifying oblique projecting lens system of Figure 6, and also a direct viewing arrangement analogous to that of Figure 12.

Figures 41 and 42 illustrate the general construction of the apparatus respectively in front and side elevation. The apparatus is supported on a fixed base 400 from the front of which projects a work table 401 for carrying the object under examination, this table being supported on three slideways 402, 403, 404 so that it can be adjusted in three mutually perpendicular directions. Behind the work table, the base 400 carries a fixed horizontal shaft 405, the axis of which passes through a normal zero point 410 over the work table 401, such point being (as will be explained later) the point in which the optical axis of the projecting device cuts the section plane. The shaft 405 serves as a bearing for the rotation of a hood 420, on which the optical parts of the apparatus are carried. The rotation of the hood 420 about the shaft 405 is controlled by a pair of handwheels 421 on the hood, these handwheels carrying a worm 422 which engages with a worm wheel 406 on the shaft 405. The hood 420 with all the optical parts of the apparatus can thus be bodily rotated about a horizontal axis through the zero point 410. A counterweight 423 is provided to balance the weight of the hood and the parts carried thereby, and the hood can be clamped in any desired position under the control of a clamping handle 424.

The hood 420 curves over and at its end carries rotatably a casing 430, which may be termed the optical head, the axis of rotation of this head being perpendicular to the axis of the main shaft 405 and passing through the zero point 410. For effecting rotation of the optical head 430 about this axis, a handwheel 425 is provided in the end of the hood, this handwheel carrying a worm 426 engaging with a worm wheel 427 on the head. A clamping handle 428 enables the optical head to be clamped in any desired angular position on the hood. As will be clear from the following description of the optical head itself, the section plane as defined by the illuminating device always passes through the axis of rotation of the head in the hood, so that the two rotational adjustments above described enable the section plane to occupy any desired position (within convenient limits) through the zero point, thereby rendering the apparatus suitable for examining a wide variety of shapes and sizes of object on the work table 401, which can be adjusted in the manner above described to bring any desired point on the object to the zero point.

Turning now to the optical head 430 itself, a sectional view of which is shown in Figures 43 and 43A, this carries on its underside two guides 431, 432 into which the detachable illuminating unit can be fitted, and has within it a rotor for carrying the projection unit and also a plate box for carrying the photographic plate and a direct viewing device. The head is provided in its end walls with bearings 433 and 434 for the rotor 440, the axis of rotation passing through the zero point 410 at an angle of 45° to the axis of rotation of the head in the hood, the axis being in a plane at right angles to the section plane, as will be explained later. Adjacent to the lower bearing 433, the head has an arcuate opening 435, through which the end of the projection unit projects, and in order to prevent stray light from this opening from passing to the upper end of the head containing the plate box, the head has an internal stepped flange 436 which lies in close proximity to a rib 441 on the rotor. The rotor carries a segmental worm rack 442, with which engages a worm 437 operated by a handwheel 438 outside the head (see Figures 41 and 42). The rotor carries at its upper end outside the head a graduated scale 443 cooperating with a suitable index mark on the head itself, in order to enable the rotation of the rotor in the head to be measured.

Figure 44 is an end view of the rotor (removed from the head) looking along the axis of rotation from the lower end, and it will be seen that the lower portion of the rotor has a relatively narrow hollow form. This portion of the rotor serves for supporting the projection unit 450, which is for convenience made separate from the rotor. The mounting of this unit in the rotor is such as to enable its position to be adjusted with a high degree of accuracy. The unit 450 itself is of generally tubular form with a downwardly projecting web 451 which enters the hollow lower portion of the rotor and is secured in position therein by means of six screws 444 (three on either side) abutting against suitable facings on the web, whilst other screws 445 abut against lateral projections 452 on the tubular portion of the unit.

The tubular portion of the projection unit 450 contains centrally within it the projecting lens 453 and at its ends two mirrors 454, 455 at 45° to the axis of the lens 453 to deflect such axis through the collimating lenses 456, 457 adjacent to openings in the walls of the unit. The axis of the lower collimating lens 456 passes through the zero point 410 at right angles to the axis of rotation of the rotor, the axis of the projecting lens 453 being parallel to such axis of rotation.

The plate box 460 fits tightly into an opening in the wall of the head and has a flange 461 making a light-tight joint around such opening. The box has an opening 462 through which a plate slide 470 can be inserted, the slide entering guides 463 rotatably mounted in the walls of the box, so that it can be rocked through a small angle. A roller 464 suitably mounted in the box engages with the plate slide, as the latter is being pushed in, and forces it downwards against a leaf spring 465 in the box. When the plate slide has been pushed home, the withdrawal of its shutter 471 (against which the roller 464 presses) allows the slide to rise under the action of the spring 465 into its operative position. The photographic plate 472 itself is supported in the slide on a leaf spring 473, so that when the shutter 471 has been withdrawn the plate rises into engagement with three feet 466 fixed in the box. This arrangement ensures that the plate itself will be correctly positioned (at 45° to the axis of the upper collimating lens 457) irrespective of any errors in the positioning of the plate slide.

The plate box 460 also carries a direct viewing device and when this device is to be used, a diffusing screen is substituted for the photographic plate in the plate slide. This direct viewing device comprises an eyepiece 480 and a reflector 481 at 45° above the plate position. A semi-transparent reflector 482 is interposed in the direct viewing device to enable the reflector 481 to serve also for enabling an impression of a graticule to be focussed on the photographic plate for measuring purposes, the graticule being contained, together with a suitable lamp, in a housing 483 above the eye-piece.

A movable shutter 490 is also provided between the collimating lens 457 and the photographic plate, this shutter being operated, through a slotted lever 491 controlled by a spring 492, by means of a knob 493, which in the example illustrated is shown passing through the boss of the rotor, suitable means, such as a spring-pressed ball 494 and indentations 495 in the rod 496 of the knob 493 being provided to hold the shutter lightly in its open and closed positions.

The illuminating device (which as mentioned is of the kind described with reference to Figures 19-21) comprises a casing 500 containing the lamp 501 and condenser 502, the adjustable member 503 carrying the two knife edges, the collimating lens 504, the objective 505, the wire mask 506, and the deflecting prisms 507, 508, the arrangement of which will be clear from Figures 45 and 46, and in view of the description already given in connection with Figures 19-21 it is unnecessary to refer to these parts in greater detail.

Figures 47-50 are enlarged views of the mechanism within the illuminating device for effecting the rotational and translational adjustments of the knife edge carrier 503 to suit screwthreads or gear teeth of different angles and sizes, Figures 48 and 49 being sections on the lines 48—48 and 49—49 of Figure 47, whilst Figure 50 is a diagrammatic perspective view of the mechanism. The rotational adjustment of the knife edge carrier 503 is controlled by a hand knob 510 on one side of the device, and the translational movement by another hand knob 520 on the opposite side.

The knob 510 carries a cam 511 engaging with a roller 512 on an arm 513 controlled by a spring 514, the arm 513 extending across to the other side of the device where it is connected through a link 515 to the knife edge carrier 503, and being pivoted on a fixed pin 516.

The knob 520 carries a cam 521 engaging with a roller 522 carried by a lever 523 pivoted at 524 and controlled by a spring 525, a pin 530 on the carrier 503 engaging in a hole in the lever 523. This pin 530 is in line with the base of the slot between the two knife edges and acts as a pivot for rotation of the carrier 503 when the knob 510 is operated, since the pull or push of the link 515 on the carrier is approximately in the same direction as the length of the lever 523, which is held in place by the spring 525. The translational movement of the carrier 503, when the knob 520 is operated, takes place without materially disturbing the orientation of the carrier, since the links act more or less to give a parallel link motion. The carrier 503 is supported against the side plate 531 by means of feet 532 and 533, as well as the foot formed by the pivot pin 534 connecting the link 515 to the carrier.

The operation of the practical apparatus will be clear from the description already given of the preceding diagrammatic drawings.

It will be appreciated that the foregoing arrangements have been described by way of example only, and that the invention can be carried into practice in a variety of other ways.

Features of the invention disclosed and described but not claimed herein are claimed in my following co-pending applications filed as divisions of this application: Serial No. 279,253, filed June 15, 1939; Serial No. 338,691, filed June 4, 1940; and Serial No. 345,079, filed July 12, 1940.

What I claim as my invention and desire to secure by Letters Patent is:

1. Means for optically defining the profile of a plane section of an object, comprising a source of light, two parallel and oppositely directed knife edges constituted by the two sides of a slot, reflecting devices in the paths of the two sets of rays from the source respectively passing the two knife edges for separately deflecting them to form non-parallel images of the knife edges and for deflecting the rays on to the object surface, and an optical system acting in conjunction with the reflecting devices to form coplanar and mutually inclined focussed images of the two knife edges on adjacent parts of the surface of the object and thereby to define adjacent non-collinear portions of the plane section profile thereon.

2. The combination with the features set forth in claim 1, of means for adjusting the pair of knife edges both rotationally and translationally whereby the relative inclination and position of the two images can be varied to suit the shape of the plane section profile.

3. The combination with the features set forth in claim 1, of means whereby the diffused light from the surface of the object is utilised for the optical projection of an image of the section profile.

4. The combination with the features set forth in claim 1, of means for adjusting the pair of knife edges both rotationally and translationally whereby the relative inclination and position of the two images can be varied to suit the shape of the plane section profile, and means for optically projecting an image of the section profile in a direction oblique to the section plane.

5. The combination with the features set forth in claim 1, of means for optically projecting in a direction oblique to the section plane a rectified image of the section profile free from distortion due to the oblique projection.

6. The combination with the features of claim 1, of an optical system for projecting obliquely to the section plane a rectified image of the section profile, the optical system comprising a projecting lens and two collimating lenses so arranged as to collimate the principal rays in the object and image spaces.

7. The combination with the features of claim 1, of a rectifying oblique projecting lens system for projecting a rectified image of the section profile, and means for rotating such lens system about an axis inclined to the oblique direction in which the profile is viewed.

8. The combination with the features of claim 1, of a photographic plate disposed in a plane at right angles to the section plane, a rectifying oblique projecting lens system for obliquely projecting a rectified image of the section profile, reflecting devices associated with such lens system whereby the rectified image is formed on the photographic plate, and means for rotating the lens system and reflecting devices about an axis which intersects the section plane and the photographic plate in points which are conjugate with one another with respect to the lens system, whereby a composite photograph of the whole section profile can be built up from partial images obtained by exposure of the plate in different rotational positions of the lens system.

9. Optical apparatus for measuring or testing the accuracy of the profile of a plane section of an object, comprising a base, a hood rotatably mounted on the base, an optical head rotatably mounted on the hood so that it can be rotated about an axis lying in the section plane at right angles to the axis of rotation of the hood, means carried by the optical head for defining the plane section profile on the surface of the object, and means carried by the optical head for projecting in a direction oblique to the section plane an accurately focussed image of an extensive portion of the profile.

10. Optical apparatus for measuring or testing the accuracy of the profile of a plane section of an object, comprising a base, a hood rotatably mounted on the base, an optical head rotatably mounted on the hood so that it can be rotated about an axis at right angles to the axis of rotation of the hood, a support for the object adjustably mounted on the base, means whereby said support can be adjusted to bring the portion of the surface of the object to be examined close to the point of intersection of such axes of rotation, means carried by the optical head for defining the plane section profile on the surface of the object the axis of rotation of the head lying in the section plane, and an optical projecting device in the optical head for viewing the profile obliquely to the section plane and projecting a rectified image thereof.

11. The combination with the features of claim 10, of means whereby the optical projecting device can be rotated within the optical head about an axis passing through the point of intersection of the axes of rotation of the head and the hood.

12. The combination with the features of claim 10, of means within the optical head for supporting a photographic plate, a plate slide withdrawably mounted in such supporting means, a spring mounting for the plate within the plate slide whereby when the slide is opened ready for exposure of the plate the plate will move into a position determined independently of the slide wherein it lies accurately in the image plane of the projecting device.

13. Optical measuring or testing apparatus, comprising a work support for carrying the object to be examined, means for defining on the surface of the object the profile of the section in which the object is cut by a section surface, an optical projecting device for projecting in a direction oblique to the section plane an accurately focussed image of an extensive portion of the section profile, an optical head for carrying the profile-defining means and the projecting device, means for mounting the optical head for rotation about an axis lying in the section surface, and means whereby relative rotational movement can be imparted to such mounting means and to the work support about a second axis which passes through the point of intersection of the optical axis of the projecting device and the section surface.

14. Optical measuring or testing apparatus, comprising a work support for carrying the object to be examined, means for defining on the surface of the object the profile of the section in which the object is cut by a section plane, an optical projecting device for projecting in a direction oblique to the section plane a rectified image of the section profile free from distortion due to the oblique projection, an optical head for carrying the profile-defining means and the projecting device, means whereby relative rotational movement can be imparted to the work support and the optical head about two mutually perpendicular axes, and means for rotating the optical projecting device within the optical head about an axis inclined to the optical axis of the projecting device and passing through the point of intersection of the optical axis with the section plane.

15. Optical measuring or testing apparatus, comprising a work support for carrying the object to be examined, means for defining on the surface of the object the profile of the section in which the object is cut by a section plane, an optical head for carrying the profile-defining means, an optical projecting device also carried by the optical head for projecting in a direction oblique to the section plane on to an image plane fixed in position in the optical head a rectified image of the section profile free from distortion due to the oblique projection, reflectors forming part of the projecting device for deflecting the optical axis thereof, means for rotating the projecting device within the optical head about an axis which passes through the point of intersection of such optical axis with the section plane and intersects the image plane in a point which is the image of such point of intersection, and means for rotating the optical head relatively to the work support about an axis lying in the section plane.

16. The combination with the features of claim 14, of a withdrawable plate slide accommodated within a compartment in the optical head and containing a photographic plate located in the image plane of the projecting device for receiving the projected image of the section profile.

17. The combination with the features of claim 15, of a withdrawable plate slide accommodated within a compartment in the optical head and containing a photographic plate located in the image plane of the projecting device for receiving the projected image of the section profile.

18. The combination with the features of claim 13, of means for imparting relative translational movement in three mutually perpendicular directions to the work support and the optical head to enable the object on the work support to be brought into the appropriate position relatively to the two axes of rotation.

19. Optical measuring or testing apparatus as claimed in claim 13, in which the profile-defining means comprises an illuminating device for directing on to the surface of the object a beam of light having (at least on one side) a sharply defined bounding surface constituting the section surface, the diffused light from the object surface being utilized for the optical projection of the image.

20. Optical apparatus as claimed in claim 9, in which the profile-defining means comprises two parallel and oppositely directed knife edges constituted by the two sides of a slot, means for illuminating such knife edges, reflecting devices in the paths of the two sets of rays from the source respectively passing the two knife edges for separately deflecting them to form non-parallel images of the knife edges and for deflecting the rays on to the object surface, and an optical system acting in conjunction with such reflecting devices to form coplanar and mutually inclined focussed images of the two knife-edges on adjacent non-collinear parts of the object surface and thereby to define adjacent non-collinear portions of the plane section profile thereon.

21. Optical apparatus as claimed in claim 14, in which the profile-defining means comprises two parallel and oppositely directed knife edges constituted by the two sides of a slot, means for illuminating such knife edges, reflecting devices in the paths of the two sets of rays from the source respectively passing the two knife edges for separately deflecting them to form non-parallel images of the knife edges and for deflecting the rays on to the object surface, and an optical system acting in conjunction with such reflecting devices to form coplanar and mutually inclined focussed images of the two knife-edges on adjacent non-collinear parts of the object surface and thereby to define adjacent non-collinear portions of the plane section profile thereon.

22. The combination with the features of claim 1, of means comprising lever and link mechanisms for adjusting the pair of knife edges both rotationally and translationally whereby the relative inclination and position of the two images can be varied to suit the shape of the plane section profile, the mechanism for effecting the translational adjustment including a linkage which is at least an approximation to a parallel linkage and of which two of the arms are constituted respectively by a lever and a link forming part of the mechanism for effecting the rotational adjustment.

23. The combination with the features of claim 1, of means comprising lever and link mechanisms for adjusting the pair of knife edges both rotationally and translationally whereby the relative inclination and position of the two images can be varied to suit the shape of the plane section profile, a casing containing the profile-defining means, two coaxial rotary hand knobs on opposite sides of the casing, and two cams through which the two hand knobs respectively control the mechanisms for effecting the two adjustments.

24. In optical apparatus for measuring or testing the accuracy of plane section profiles of manufactured articles or of appliances used in their manufacture, the combination of an illuminating device comprising at least one slit or knife-edge and means for focussing such slit or knife edge more or less accurately on the surface of the object under examination to define the section profile, a rectifying oblique projecting lens system for obliquely projecting a rectified image of the section profile, a photographic plate in the image plane of such lens system for receiving the rectified image, means for rotating the lens system about an axis inclined to the direction in which the profile is viewed, and means for maintaining the correct angular relationship between the section plane and the photographic plate whereby partial images of the profile obtained in different rotational positions of the lens system will be properly correlated with one another to form a composite photograph of the whole section profile.

25. Optical measuring or testing apparatus, comprising means for defining the profile of a plane section of the object under examination, a projecting device for projecting in a direction oblique to the section plane a rectified image of the section profile free from distortion due to the oblique projection, such device including a system of lenses arranged to collimate the principal rays in its object and image spaces, means for rotating the projecting device about an axis inclined to the direction in which the profile is viewed, and means for maintaining the correct angular relationship between the section plane and the image plane whereby partial images of the profile obtained in different rotational positions of the projecting device will be properly correlated with one another in the image plane.

RICHARD EDMUND REASON.

CERTIFICATE OF CORRECTION.

Patent No. 2,256,102. September 16, 1941.

RICHARD EDMUND REASON.

It is hereby certified that error appears in the printed specification of the above numbered patent requiring correction as follows: Page 1, first column, line 2, after "and" insert --is--; page 3, second column, line 22, strike out "lens. The projecting lens 140 may be corrected" and insert the same after the word "projecting" in line 19; page 5, first column, line 43, after "of" insert --an--; same page, second column, line 44, for "inclned" read --inclined--; page 12, second column, line 23, claim 23, for "profie" read --profile--; and that the said Letters Patent should be read with this correction therein that the same may conform to the record of the case in the Patent Office.

Signed and sealed this 28th day of October, A. D. 1941.

Henry Van Arsdale,
Acting Commissioner of Patents.

(Seal)